United States Patent [19]
Mirek et al.

[11] Patent Number: 5,878,032
[45] Date of Patent: Mar. 2, 1999

[54] DELAY MONITORING OF TELECOMMUNICATION NETWORKS

[75] Inventors: Beata Malgorzata Mirek, Nepean; Darren Frederick Toop, Ottawa, both of Canada

[73] Assignee: Northern Telecom Limited, Montreal, Canada

[21] Appl. No.: 965,930

[22] Filed: Nov. 7, 1997

[51] Int. Cl.⁶ .................................................. G01R 11/06
[52] U.S. Cl. ........................... 370/252; 370/519; 375/354
[58] Field of Search ....................................... 370/252, 241, 370/249, 395, 516, 517, 519; 371/20.5; 340/825.06; 379/5; 375/354

[56] References Cited

U.S. PATENT DOCUMENTS 5,450,394  9/1995  Gruber et al. .............................. 370/17
5,777,988  7/1998  Cisneros .................................. 370/252

OTHER PUBLICATIONS

Bellcore Technical Advisory TA–NWT–001248, Issue 1, Oct. 1992, "Generic Requirements for Operations of Broadband Switching System", pp. 5–12 and 5–13.

*Primary Examiner*—Chau Nguyen
*Assistant Examiner*—Thinh Vu

[57] ABSTRACT

Novel techniques are disclosed for continuously monitoring parameters of delay between two nodes in a telecommunication network such as an ATM or frame relay network. The techniques use measurement cells, i.e. test cells, test frames, performance management ATM OAM cells, or performance management frame relay frames. These cells or frames contain a timestamp indicating the time a cell or frame is sent and a delay value indicating a difference between reception and transmission times of the cell or frame.

9 Claims, 2 Drawing Sheets

DELAY MONITORING OF TELECOMMUNICATION NETWORKS

FIELD OF THE INVENTION

The invention relates generally to monitoring performance of a telecommunication network. In particular, it is directed to monitoring of the cell delay in a telecommunication network, e.g. ATM networks, frame relay networks etc., using measurement cells, test cells or OAM (Operations, Administration, and Maintenance) cells or, in the case of a frame relay network, test or OAM frames.

BACKGROUND OF THE INVENTION

Telecommunication networks must be properly maintained to ensure that adequate network performance is achieved and that end-user services are supported. Maintenance functions include "performance management" (continuous in-service performance monitoring for proactive warning of performance degradation) and "fault management" (detection and location of network trouble and failure).

Delay monitoring is important in managing performance of ATM or other telecommunications networks and the following parameters are used for such purposes because they affect important network management functions.

Cell Transfer Delay (CTD)

Relates to throughput and response time for high speed data services, and is used for:

provisioning congestion and protocol parameters such as window sizes and time-outs;

selecting low delay routes (e.g. to avoid satellite links); and deploying echo cancellers.

Cell Delay Variation (CDV)

Used for:

dimensioning AAL-1 buffers for smoothing CBR (continuous bit rate) traffic;

detecting excessive traffic; and predicting congestion.

To support performance and fault management functions of VPC/VCC (virtual path connection/virtual channel connection) in ATM networks, OAM cells are defined to carry operation information such as error checks, node identifiers (IDs), fault descriptions, loopback indications, timestamps, etc. OAM cells are identified in the ATM cell header as separate from user cells.

Bellcore Technical Advisory TA-NWT-001248, Issue 1, October 1992, describes on pages 5–12 and 5–13 how Performance Management OAM cells (PM OAM cells), each containing a timestamp, can be used to obtain an estimate of excessive cell transfer delay occurrences at the broadband switching system that receives the timestamp information in the forward report within the forward monitoring cell. It further states that this count can only be made and stored at the connection/segment end point that receives the forward monitoring cell, because at present there is no field in the PM OAM cell that allows backward reporting of excessive cell transfer delay occurrences. Bellcore goes on to state:

If "the clocks of the BSSs are synchronized in absolute time, . . . the one-way delay can be measured directly with a Performance Management OAM cell. However while the frequencies of the BSSs' clocks will be almost perfectly matched in a BISDN network, the absolute time is not expected to be synchronized. In practice, absolute time differences of several seconds are possible.

Whether the clocks are synchronized or not, there is a lower bound on the delays observed at a receiving node. Delays longer than the minimum would be caused by queuing and processing delays. . . . the parameter of interest is how many delay measurements exceed the maximum allowed value, $L+V_{max}$, where L is the lowest observed value (obtained through calibration).

When the timestamp is being used, it is encoded in the PM OAM cell at the originating end. This time stamp will be accurate to within $\pm 1.0$ μsec. The terminating end point compares the time stamp to the time shown by its own clock. This comparison needs to be done as soon as OAM processing has begun on the received PM OAM cell, so that the delay measurement includes as little OAM cell processing time as possible. Variation of the delay experienced by the PM OAM cell will provide a good estimate of the delay variation experienced by the user-information cells.

One can estimate the lowest value, L, by a calibration procedure in which the delays of the first C PM cells [C may be e.g. 1000] are observed, and the lowest value is recorded. Note that L may be negative, because the clocks of the two nodes are not necessarily synchronized. The amount by which the observed delay measurements exceed L provides an unbiased estimate of the delay variation."

To summarize, Bellcore states that:

"To measure cell delay variation, the following actions have to be performed:

the originating mode must encode time stamps, the receiving node must calibrate the first C PM cells to calculate L, and the receiving node must count the number of PM cells with delays greater than $L+V_{max}$.

Monitoring can be performed at different locations in a network and the following are examples:

a) Near-End monitoring which provides performance of a received signal from its origination to its termination. Bit Interleaved Parity (BIP) is used for ATM by forward monitoring OAM cells. The monitoring point is at the received signal termination.

b) Far-End monitoring provides performance of a transmitted signal from its origination to its termination. For ATM, performance at the far-end termination is sent back to the monitoring point in received signal overhead, e.g. backward reporting OAM cells. The monitoring point is at the received signal termination where the overhead is read.

c) Intermediate monitoring is at intermediate locations in a transparent mode such that near- and far-end performance indicators are read but not terminated. This provides performance of the received signal from its origination to the intermediate monitoring point (e.g. by calculating BIP in forward monitoring OAM cells), and performance of a transmitted signal from its origination to its termination (e.g. by reading backward reporting OAM cells at the intermediate monitoring point).

As seen in the above description, the technique described by Bellcore only provides near-end monitoring, and for one parameter only.

In U.S. Pat. No. 5,450,394 Sep. 12, 1995 Gruber et al, good techniques for monitoring delays in telecommunications networks are described. The techniques use measurement cells (test cells, PM OAM cells, test frames etc.,) for sending timestamps between two nodes. In one example in the patent, node A sends to node B a measurement cell containing timestamp value T1 indicating the time the measurement cell is sent, according to a clock at node A. In response to the measurement cell, node B sends to node A a reporting measurement cell containing timestamp value T3 and a delay difference value Td, wherein Td=T2−T1, and T2 and T3 are respectively the times the measurement cell is received at node B and the reporting measurement cell is sent from node B, both according to a clock at node B. Node A then receives the reporting measurement cell at time T4, according to the clock at node A, and calculates delay parameters using T1, T3, T4 and Td.

In the patent, by using these values, node A is able to calculate cell delay variation, (CDV), round trip delay (RTD), cell transfer delay (CTD) etc. The clocks at nodes A and B are not neccessarily synchronized It should be noted, however, that all the above calculations call for T1 value which must be stored at least until T4, that is to say, until node A receives the reporting measurement cell from node B.

The present invention uses similar techniques as described in the patent. The present inventors, however, have realized that for certain delay monitorings e.g., RTD and CTD, timestamp values do not have to be stored at either node.

OBJECTS OF THE INVENTION

It is therefore an object of the present invention to provide a method of and apparatus for monitoring performance of a telecommunication network such as an ATM or frame relay network.

It is another object of the present invention to provide a method of and apparatus for monitoring delay parameters of a telecommunication network such as an ATM or frame relay network.

It is a further object of the present invention to provide a method of and apparatus for near-end monitoring of delay parameters of a telecommunication network such as an ATM network using measurement cells.

SUMMARY OF THE INVENTION

Briefly stated, according to one aspect, the invention is directed to a method of measuring delay parameters between nodes A and B in a telecommunication network. The method comprises steps of node A sending to node B a measurement cell containing timestamp value T1 indicating the time the measurement cell is sent, according to a clock at node A and receiving at time T4, according to the clock at node A a reporting measurement cell from node B, the reporting measurement cell containing the timestamp value T1 and a delay difference value Tb, wherein Tb=T3−T2, and T2 and T3 are respectively the time at which node B received the measurement cell from node A and the time at which node B sent the reporting measurement cell to node A, both according to a clock at node B. The method further includes a step of calculating delay parameters using T1, T4 and Tb.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF PREFERRED EMBODIMENTS

Figure 1:
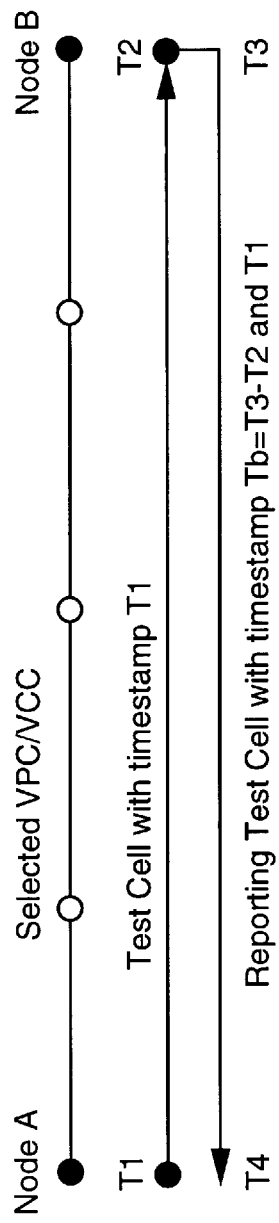
FIG. 1 is a schematic illustration of a basic concept of the present invention.

FIG. 1 depicts schematically the basic concept of near-end and far-end performance monitoring of an ATM network at node A. Near-end and far-end monitoring can be performed independently, however, for convenience the figure shows both. According to one embodiment of the present invention, when monitoring of both near- and far-end is performed, single-ended monitoring is possible at node A. In the figure, the following designations are employed:

T1 is the timestamp value indicating when a measurement cell is sent from A, according to A's clock;

T2 is the time the measurement cell is received at B, according to B's clock;

T3 is the timestamp value indicating when a reporting measurement cell is sent from B, according to B's clock; and T4 is the time the reporting measurement cell is received at A, according to A's clock.

It should be noted that the measurement cell and reporting measurement cell described above can be any specialized cells, they can be test cells, or PM OAM cells. OAM cells are defined in ATM standards and are used for in-service monitoring. The test cells, on the other hand, are used for out-of-service measurements. It is to be understood, therefore, that measurement cells, test cells and OAM cells are interchangeably used throughout this application. OAM cells will be described in more detail below with respect to a different embodiment of the present invention. In frame relay networks, on the other hand, test or OAM frames can be used.

Delays can be expressed as follows:

$$Td=T2-T1=\text{transfer delay}+\text{variable delay}+\text{TOD error} \quad (1)$$

at B, for A to B direction; and $$Ts=T4-T3=\text{transfer delay}+\text{variable delay}+\text{TOD error} \quad (2)$$

at A, for B to A direction.

In the above equations, the TOD (Time of Day) error is a discrepancy between individual clocks at A and B and equal in value in each direction; it is considered constant during the period of delay test. The transfer delay is system specific and includes propagation and processing delays. Transfer delay is also considered constant in each direction during the period of delay test. The variable delays are not necessarily equal in each direction. A change in Td or Ts is called cell delay variation (CDV). It should be noted that in unidirectional monitoring (single-ended monitoring at one node), the test is initiated at node A when node A sends a forward monitoring cell or frame to node B and node B responds by sending to node A a backward reporting cell or frame. Full test results are available only at node A.

Referring to FIG. 1 again, the algorithmic process of one embodiment of the invention is explained as follows:

Node A sends to node B a measurement cell with timestamp T1, according to the node A's clock;

Node B receives the measurement cell at T2, according to the node B's clock and copies timestamp T1;

At T3, according to the node B's clock, node B sends to node A a reporting measurement cell containing timestamp T1 and delay difference information Tb, where Tb=T3−T2;

Node A receives the reporting measurement cell at T4, according to the node A's clock.

Thus Node A has in its possession values T1, T4 and Tb and will be able to obtain various delay parameters using these values.

Round Trip Delay (RTD) can be determined as the sum of the delay differences $$RTD=(T4-T3)+(T2-T1) \quad (3)$$

Equation (3) can be rearranged as below:

$$RTD=(T4-T1)-(T3-T2)=(T4-T1)-Tb. \quad (4)$$

Equation (4) thus indicates that RTD is the total round trip delay (T4−T1) less (T3−T2) which includes the cell processing delay and other miscellaneous delays of equipment at node B. From RTD, the cell transfer delay (CTD) in one direction can be calculated as $$CTD=RTD/2=\{(T4-T1)-Tb\}/2. \quad (5)$$

If Time of Day (TOD) distribution among network nodes were accurate, or in other words, if the clocks at the nodes were perfectly synchronized in absolute time, the TOD error in Equations (1) and (2) would be zero. However, in practice, the TOD error can be of the order of a few seconds, so that direct monitoring of one-way transfer delay using timestamps in Equations (1) and (2) is impractical. However, it should be noted that even if the clocks at the nodes are not synchronized, Equations (3) and (4) are always true for RTD measurement because the TOD error in the direction from A to B in equation (1) will cancel out with the TOD error in another direction from B to A in equation (2).

Other delay parameters can be obtained at node A.

Maximum Cell Transfer Delay (MCTD)

Averaging samples of CTD provides the mean one-way delay, but for certain circumstances it is more useful to monitor the maximum CTD.

Thus:

$$\text{Max. } CTD=\text{Max. } RTD/2=\text{Max. } \{(T4-T1)-(Tb)\}/2 \quad (6)$$

This is a reasonable estimate of maximum CTD, since physical routing of ATM connections is the same in each direction, that is to say, propagation and nominal processing delays are similar in each direction, although CDV may differ. In equation (6) Max. RTD is the maximum value among RTD samples obtained by equation (3) or (4).

Advantages of this single ended monitoring approach of the present invention thus far described are:

neither a Time of Day (TOD) clock (i.e., hour, min., sec., etc.), nor TOD coordination among nodes is required. The TOD error among nodes cancels; and times T1, T2, T3 and T4 don't need to be stored in the equipment at nodes while the delay measurement is underway. They are effectively stored in the test or OAM cells.

While a measurement cell containing a timestamp has thus far been described, different embodiments use test or PM OAM cells which have fields suitable for the purpose of delay monitoring.

Figure 2:
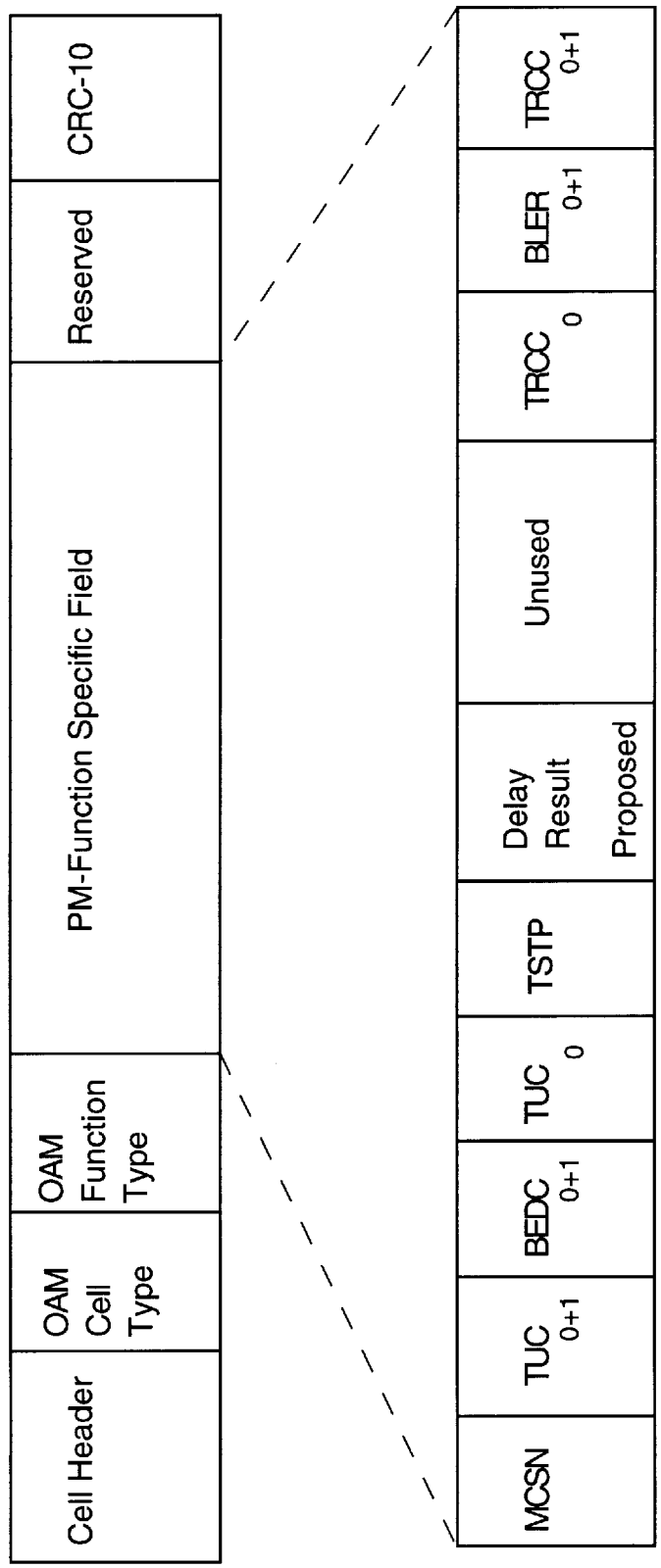
FIG. 2 shows a PM OAM cell format.

The some performance management functions included in the OAM cell format of the recent version are shown in FIG. 2 which includes a proposed delay result field.

Forward Monitoring Fields

Block Error Detection Code ($BEDC_{0+1}$) for cells with CLP (Cell Loss Priority)=0 or 1.

Backward Reporting Fields

Total Received Cell Count (TRCC); $TRCC_0$ for cells with CLP=0 and $TRCC_{0+1}$ for cells with CLP=0 or 1.

Block Error Result (BLER); $BLER_{0+1}$ for cells with CLP=0 or 1.

Delay Result: This field is proposed and will be used to report delay difference information, according to one embodiment of the invention e.g., Tb=T3−T2 in FIG. 1.

Shared Fields

Timestamp (TSTP) defined as optional in the recent version.

Monitoring Cell Sequence Number (MCSN).

Total User-cell Count (TUC); $TUC_0$ for cells with CLP=0 and $TUC_{0+1}$ for cells with CLP=0 or 1.

Delay Monitoring Implementation Considerations

Out-of-Service Approach: Test cells would be inserted and extracted at test ports. Test cells could be specialized cells with out-of-service test equipment. For delay monitoring, test cells would have a 4 byte timestamp field to carry T1 forward, and the same field could be used to carry T1 backward. In addition, there would be an additional 4 byte field to carry the delay difference Tb=(T3−T2) backward. These fields would be similar in principle to the delay monitoring related fields in the PM OAM cell in FIG. 2.

In-Service Approach: This approach would use the PM OAM cell. At present, the optional 4 byte timestamp field in PM OAM cells is defined for monitoring cells (and for monitoring+reporting cells), and can be used to carry T1 forward. At present, this timestamp field is unused for reporting cells, but could be used to carry T1 backward. As in FIG. 2, an additional optional 4 byte "delay result" field could be defined to carry the delay difference Tb=(T3−T2) backward.

Ignored or missing user cells have no bearing on the integrity of delay monitoring as long as a sufficiently large number of samples are reported to reliably determine CTD.

What is claimed is:

1. In a telecommunication network, a method of measuring delay parameters between node A and node B, comprising steps of:

node A sending to node B a measurement cell containing timestamp value T1 indicating the time the measurement cell is sent, according to a clock at node A;

node A receiving at time T4, according to the clock at node A a reporting measurement cell from node B, the reporting measurement cell containing the timestamp value T1 and a delay difference value Tb, wherein Tb=T3−T2, and T2 and T3 are respectively the time at which node B received the measurement cell from node A and the time at which node B sent the reporting measurement cell to node A, both according to a clock at node B; and calculating delay parameters using T1, T4 and Tb.

2. The method according to claim 1, wherein one of the delay parameters is a round trip delay RTD, the method further comprising a step of node A calculating the RTD by the following equation:

$$RTD=(T4-T1)-Tb.$$

3. The method according to claim 2, wherein another of the delay parameters are a cell transfer delay CTD and a maximum cell transfer delay MCTD, the method further comprising a step of node A obtaining the parameters by the following equations:

$$CTD=RTD/2, \text{ and}$$

$$MCTD=\text{Max. } RTD/2.$$

4. The method according to claim 1 wherein the measurement cell is a test cell or performance management OAM cell defined in the ATM standard, each measurement cell containing a timestamp and each reporting measurement cell further containing delay result field.

5. The method according to claim 1 wherein the telecommunication network is a frame relay network and the measurement cell is a measurement frame, each measurement frame containing a timestamp and each reporting measurement frame further containing delay result field.

6. The method according to claim 2 wherein the measurement cell is a test cell or performance management OAM cell defined in the ATM standard, each measurement cell containing a timestamp and each reporting measurement cell further containing delay result field.

7. The method according to claim 2 wherein the telecommunication network is a frame relay network and the measurement cell is a measurement frame, each measurement frame containing a timestamp and each reporting measurement frame further containing delay result field.

8. The method according to claim 3 wherein the measurement cell is a test cell or performance management OAM cell defined in the ATM standard, each measurement cell containing a timestamp and each reporting measurement cell further containing delay result field.

9. The method according to claim 3 wherein the telecommunication network is a frame relay network and the measurement cell is a measurement frame, each measurement frame containing a timestamp and each reporting measurement frame further containing delay result field.

* * * * *